US012412350B2

(12) United States Patent
Maschmeyer et al.

(10) Patent No.: US 12,412,350 B2
(45) Date of Patent: Sep. 9, 2025

(54) SYSTEMS AND METHODS FOR EDITING CONTENT ITEMS IN AUGMENTED REALITY

(71) Applicant: Shopify Inc., Ottawa (CA)

(72) Inventors: Russ Maschmeyer, Berkeley, CA (US); Eric Andrew Florenzano, San Francisco, CA (US); Brennan Letkeman, Calgary (CA); Diego Macario Bello, Montreal (CA); Daniel Beauchamp, Toronto (CA)

(73) Assignee: Shopify Inc., Ottawa (CA)

( * ) Notice: Subject to any disclaimer, the term of this patent is extended or adjusted under 35 U.S.C. 154(b) by 219 days.

(21) Appl. No.: 17/994,752

(22) Filed: Nov. 28, 2022

(65) Prior Publication Data
US 2024/0087267 A1 Mar. 14, 2024

Related U.S. Application Data

(60) Provisional application No. 63/405,993, filed on Sep. 13, 2022.

(51) Int. Cl.
G06T 19/20 (2011.01)
G06F 3/04815 (2022.01)
G06F 3/04845 (2022.01)
G06T 11/00 (2006.01)
G06T 19/00 (2011.01)

(52) U.S. Cl.
CPC .......... *G06T 19/20* (2013.01); *G06F 3/04815* (2013.01); *G06F 3/04845* (2013.01); *G06T 11/00* (2013.01); *G06T 19/006* (2013.01); *G06T 2200/24* (2013.01); *G06T 2210/32* (2013.01); *G06T 2219/2004* (2013.01)

(58) Field of Classification Search
None
See application file for complete search history.

(56) References Cited

U.S. PATENT DOCUMENTS

| 11,250,617 | B1 * | 2/2022 | Sempe | H04L 65/611 |
| 2010/0033484 | A1 * | 2/2010 | Kim | G06T 19/006 345/426 |
| 2017/0336941 | A1 * | 11/2017 | Gribetz | G06T 19/20 |
| 2018/0114368 | A1 * | 4/2018 | Marketsmueller | G06F 3/04883 |
| 2019/0065043 | A1 * | 2/2019 | Zambetti | G06F 3/04845 |
| 2019/0378341 | A1 * | 12/2019 | Xie | H04N 21/8146 |
| 2021/0272368 | A1 * | 9/2021 | Dorin | G06T 19/006 |
| 2021/0350634 | A1 * | 11/2021 | Major | G06T 17/00 |
| 2022/0084296 | A1 * | 3/2022 | Sadalgi | G06T 15/50 |
| 2022/0122303 | A1 * | 4/2022 | Sasikumar | G06T 3/20 |

(Continued)

Primary Examiner — Sultana M Zalalee
(74) Attorney, Agent, or Firm — Rowand LLP

(57) ABSTRACT

A computer-implemented is disclosed. The method includes: generating an augmented reality (AR) scene that includes a virtual 3D representation of a product and a view of a first graphical user interface; monitoring user interactions with the virtual 3D representation of the product based on detected gestures of the user; determining modifications to the virtual 3D representation of the product based on the monitored user interactions; presenting, in the AR scene, a modified 3D representation of the product; converting the modified 3D representation of the product to a 2D image; and causing the 2D image to be displayed at a defined location of the first graphical user interface in AR.

19 Claims, 11 Drawing Sheets

(56) References Cited

U.S. PATENT DOCUMENTS

| | | | | |
|---|---|---|---|---|
| 2022/0229535 A1* | 7/2022 | Evangelista | | H04N 7/147 |
| 2022/0327790 A1* | 10/2022 | Melling | | G06F 3/04845 |
| 2022/0358726 A1* | 11/2022 | Teixido | | A61B 5/4023 |
| 2022/0414975 A1* | 12/2022 | Becker | | G06F 3/04845 |
| 2023/0136597 A1* | 5/2023 | Thiel | | G06T 19/20 |
| | | | | 345/419 |
| 2023/0177594 A1* | 6/2023 | Besecker | | G06T 19/20 |
| | | | | 705/27.2 |
| 2024/0273838 A1* | 8/2024 | Palangie | | G06F 3/017 |

* cited by examiner

SYSTEMS AND METHODS FOR EDITING CONTENT ITEMS IN AUGMENTED REALITY

CROSS-REFERENCE TO RELATED APPLICATION

The present application claims the benefit of priority to U.S. Provisional Patent Application No. 63/405,993 filed on Sep. 13, 2022, the contents of which are incorporated herein by reference.

TECHNICAL FIELD

The present disclosure relates to augmented reality and, in particular, to systems and methods for editing content items within graphical user interfaces in augmented reality.

BACKGROUND

An e-commerce platform may provide merchants with a suite of tools for creating, modifying, and otherwise managing their online storefronts. These tools may be used for controlling the appearance and functionalities of merchant storefronts. For example, merchants may use such tools to customize the layout of content items (e.g., banners, product images, description text boxes, etc.) on their store website by specifying the size, display order, and/or location of the content items.

BRIEF DESCRIPTION OF THE DRAWINGS

Embodiments will be described, by way of example only, with reference to the accompanying figures wherein.

Like reference numerals are used in the drawings to denote like elements and features.

DETAILED DESCRIPTION OF EMBODIMENTS

Figure 1:
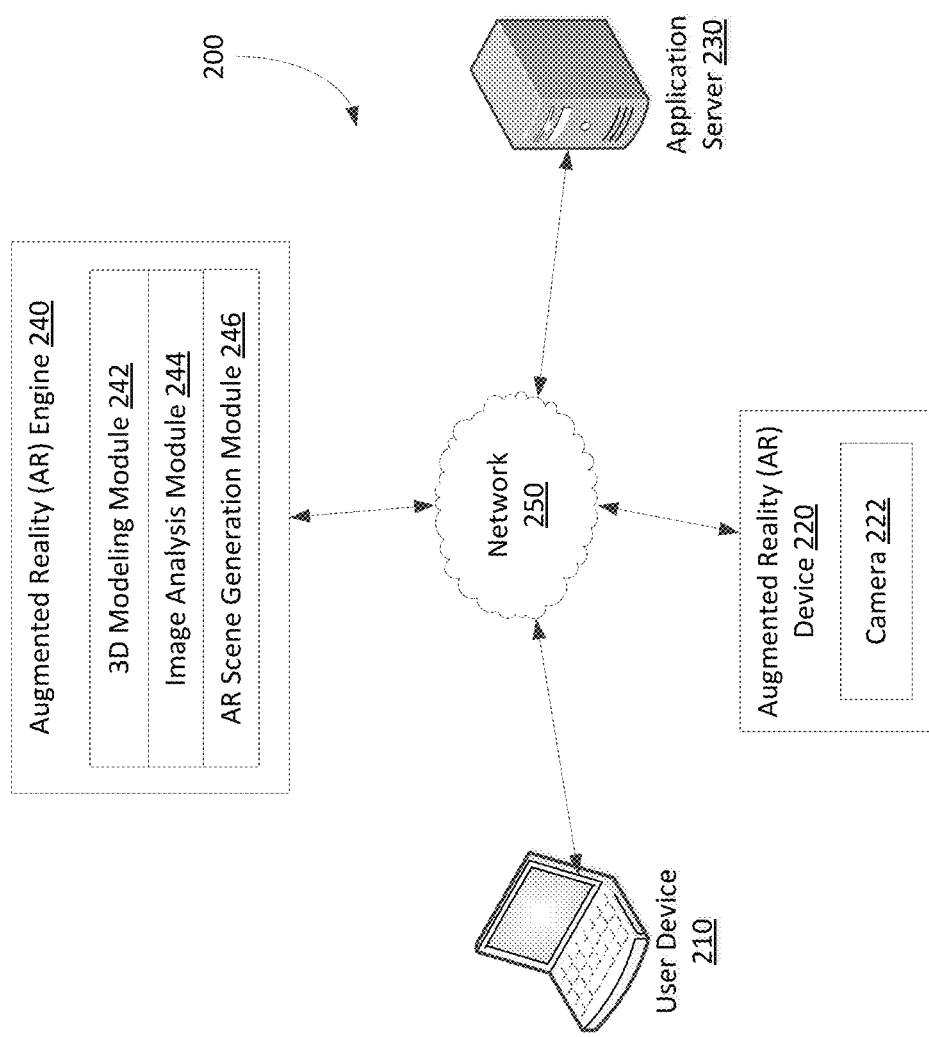
FIG. 1 illustrates an example system for managing graphical user interfaces in augmented reality (AR)

In an aspect, the present application discloses a computer-implemented method. The method includes: generating an augmented reality (AR) scene that includes a virtual 3D representation of a product and a view of a first graphical user interface; monitoring user interactions with the virtual 3D representation of the product based on detected gestures of the user; determining modifications to the virtual 3D representation of the product based on the monitored user interactions; presenting, in the AR scene, a modified 3D representation of the product; converting the modified 3D representation of the product to a 2D image; and causing the 2D image to be displayed at a defined location of the first graphical user interface in AR.

In some implementations, the first graphical user interface may be provided on a display device that is viewable in the AR scene.

In some implementations, the method may further include receiving user selection of a first 2D image that is presented in the first graphical user interface, and the AR scene may be generated responsive to receiving the user selection of the first 2D image.

In some implementations, receiving the user selection of the first 2D image may include receiving at least one of: a touch input on a touch-sensitive interface; a selection using an input device such as a stylus; or a gesture for interacting with the first 2D image as displayed on a virtual display device.

In some implementations, the method may further include: comparing image data associated with the selected first 2D image and metadata associated with a plurality of 3D virtual scenes; and determining a match between the image data associated with the selected first 2D image and metadata of a first one of the 3D virtual scenes, and the AR scene may be generated based on the metadata of the first 3D virtual scene.

In some implementations, causing the 2D image to be displayed at a defined location of the first graphical user interface may include replacing the first 2D image with the 2D image converted from the modified 3D representation of the product on the first graphical user interface.

In some implementations, the method may further include obtaining sensor data of sensors for tracking gestures of the user, and the gestures of the user in the first real-world environment may be detected based on the obtained sensor data.

In some implementations, the sensors may include at least one of: cameras; LiDAR array; eye trackers; or hand trackers.

In some implementations, the AR scene may further include a virtual representation of a camera that is positioned adjacent to the 3D representation of the product and determining the modifications to the virtual 3D representation of the product may include identifying imaging effects on the 3D representation of the product corresponding to adjustments of the camera by the detected gestures of the user.

In some implementations, the adjustments of the camera may include at least repositioning of the virtual representation of the camera.

In some implementations, converting the modified 3D representation of the product to the 2D image may include obtaining an image of the modified 3D representation of the product as output by a virtual camera associated with the AR scene.

In some implementations, the method may further include transmitting, to an AR-enabled computing device, the 2D image and instructions for displaying the 2D image on the first graphical user interface.

In some implementations, the method may further include detecting completion of edits of the 3D representation of the product, and the modified 3D representation of the product may be converted to the 2D image responsive to detecting the completion of edits.

In another aspect, the present application discloses a computing system. The computing system includes a processor and a memory coupled to the processor. The memory stores computer-executable instructions that, when executed, configure the processor to: generate an augmented reality (AR) scene that includes a virtual 3D representation of a product and a view of a first graphical user interface; monitor user interactions with the virtual 3D representation of the product based on detected gestures of the user; determine modifications to the virtual 3D representation of the product based on the monitored user interactions; present, in the AR scene, a modified 3D representation of the product; convert the modified 3D representation of the product to a 2D image; and cause the 2D image to be displayed at a defined location of the first graphical user interface in AR.

In another aspect, the present application discloses a non-transitory, computer-readable medium storing computer-executable instructions that, when executed by a processor, configure the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Editing Content Items within Graphical User Interfaces in Augmented Reality

Static content items, such as two-dimensional images (e.g., photographs), are generally not amenable to direct content editing. A web developer may, for example, upload a product photo as a content item to be added to a product page (e.g., a web or application page). Once the photo is displayed on the product page, if the developer wishes to alter the depiction of the product in the original photo, they would typically either replace the original photo with an existing replacement photo of the product or capture a new photo of the product as desired. In particular, if a suitable replacement photo does not exist, a new photo may be required to be taken in order to effect the desired change to the product page.

Additionally, or alternatively, the developer may launch a photo editor tool to edit the original photo. The editor tool may offer options for modifying the original photo as functions which may be accessed within the editor tool. In particular, the editor tool may allow the developer to adjust various image properties, such as brightness, contrast, white balance, etc., of the original photo. The editor tool interface may be displayed together with a preview of the edited photo on the product page within the same GUI (e.g., web browser). Due to inherent constraints on available space in GUIs, the features of the editor tool which may be displayed concurrently with the product page may be limited. In some instances, the editor tool interface may be presented independently of the product page. For example, the developer may need to navigate to a separate page of the GUI in order to access the editor tool's functions. This limits the capacity for concurrently viewing the visual effects of the photo edits in the context of the product page. Once the original photo has been edited, the developer would navigate back to the product page to replace the original photo with its edited version. The scope of direct, or in situ, editing of photos (and other static content items) for a product page may thus be limited.

The present invention encompasses methods that leverage use of augmented reality (AR) to enable in situ editing of content items within graphical user interfaces. As a specific example, merchants may edit content items that are displayed in an online storefront, such as a web or mobile application page, without having to navigate to a separate content editor interface or generate or capture anew replacement content items.

In at least some implementations, the disclosed methods may allow merchants to edit media content items, such as images, videos, etc., based on manipulating virtual 3D representations associated with the content items. By way of example, a merchant may select a 2D image (e.g., a product photo) that is currently displayed from a merchant's website to load a virtual 3D version of the image in AR. The merchant can then directly manipulate the 3D representation, such as by adjusting a position, camera angle, lighting, and other image settings, to the merchant's desired configuration. In particular, a virtual "workbench" space may be shown in an AR scene of the merchant's current real-world environment. The 3D representation may be modified based on the merchant's interaction with the virtual workbench in AR. The modified 3D representation can be converted to a corresponding 2D version, which may then be rendered on the merchant's website to replace the selected 2D image.

An AR engine associated with an e-commerce platform may be configured to perform the disclosed methods and operations. The AR engine may be communicably connected to sensors (e.g., motion tracking sensors, LiDAR scanner, eye trackers, external sensor stations, etc.) and configured to determine the nature of a user's interaction with a virtual workbench space in AR based, at least in part, on sensor data of the sensors.

An administrator of a merchant's online storefront (e.g., a store website) uses an AR-enabled computing device, such as a head-mounted display (HMD) or a smartphone, when managing or interacting with the online storefront. Specifically, the administrator may use the computing device to view, edit, or otherwise access content items of the online storefront. The administrator may be positioned in front of a display device—real or virtual—that displays the content items. The display device may be disposed on a desk tabletop. For example, the administrator may be seated in front of a computer monitor and wear an HMD that is configured for AR visualization of the monitor and its surroundings when managing a store website.

Using the AR-enabled computing device (or another input device), the administrator selects a content item from the online storefront. The content item may be, for example, a 2D image, such as a product photo. The 2D image may be of a scene that depicts a product. The selection may be made directly from a graphical user interface associated with the online storefront provided on a (real or virtual) display device, or it may be made via an administration interface for the online storefront, such as an administrator console. The administrator can select the 2D image by any one of the following: a touch input on a touch-sensitive interface, such as a touch screen; a selection using an input device such as a stylus; a gesture for interacting with the 2D image as displayed on a virtual display device; and the like.

Sensor data from connected sensors may be used in detecting selection of a content item. In particular, the AR engine may determine, based on the sensor data, that contact has been made with a content item as rendered on a real or virtual display device. For example, an HMD (and associated sensors) may track the position of an administrator's hands/fingers during use, and the AR engine may determine that the administrator has made contact with a product image in a store website that is rendered on a real monitor, based on the tracking data. Depending on the type of display device (e.g., real vs. virtual), the AR engine may be configured to use different criteria for identifying contact with the display device. For example, different proximity thresholds may be employed for determining whether a gesture (or other input) results in contact.

Once the selection of the 2D image is detected, the AR engine causes to be displayed, in AR, a virtual 3D representation corresponding to the selected 2D image. The 3D representation data corresponding to the selected 2D image may be generated or retrieved by the AR engine. The 3D representation may, for example, comprise a 3D model of a product that is depicted in the selected 2D image. In some embodiments, the 3D representation may be generated from one or more 2D images using machine learning or AI techniques (e.g., image classifiers, neural radiance field models, etc.). The 3D representation is editable—an administrator may manipulate the 3D representation to modify its appearance, size, location, etc. using gestures or input devices. In some implementations, the selected 2D image may be matched with corresponding 3D representation metadata (for example, using computer vision or image recognition), and an AR scene depicting the virtual 3D representation may be generated according to the 3D metadata.

The AR engine may also cause to be displayed a virtual imaging studio in the AR scene. The virtual imaging studio may, for example, comprise a 3D model of a studio workbench for creating and/or editing images. More generally, the AR engine enables the administrator to visualize virtual representations of one or more objects such as a camera, tripod, studio light(s), green screen, etc., in an AR scene of their current real-world environment. The virtual imaging studio may be launched in AR responsive to detecting selection of the 2D image by the administrator.

In at least some implementations, the virtual imaging studio and the 3D representation corresponding to the selected 2D image are shown on a desk tabletop. Specifically, if the graphical user interface associated with the online storefront is rendered on a monitor that is disposed on a desk tabletop in front of the administrator, the virtual imaging studio and 3D representation may be viewed on the desk tabletop in AR. The desk tabletop represents an intuitive location for the virtual imaging studio/3D representation relative to the administrator's position. Moreover, this particular arrangement may conveniently allow the administrator to manipulate equipment of the virtual imaging studio for editing a content item while simultaneously previewing an output of edits of the content item on the monitor, since the virtual imaging studio and the monitor would both be in the administrator's field of view in AR.

The AR engine monitors the administrator's interaction with virtual representations of (1) objects included in the 3D representation (e.g., featured products), and (2) equipment of the virtual imaging studio. The AR engine may be configured to obtain sensor data from sensors in the administrator's real-world environment and to identify motion and gestures of the administrator based on the sensor data. In particular, the AR engine may determine the nature of the administrator's interaction with equipment presented in AR scenes of the administrator's real-world environment including the virtual imaging studio.

The administrator's gestures (e.g., drag, tap, swipe, pinch, rotate, etc.) for manipulating equipment of the virtual imaging studio can be detected and associated with corresponding effects on the 3D representation corresponding to the selected 2D image. In particular, an administrator's interactions with the equipment of the virtual imaging studio can be mapped to specific effects that are desired to be produced for the selected 2D image. Such effects may include: adjusted lighting conditions; repositioning of a 3D model of a product associated with the image; repositioning of a virtual camera for the image; and the like. Each administrator interaction for producing a desired image effect may be associated with a set of detected gestures. For example, the repositioning of a 3D model of a product may be associated with a series of grab, drag, and rotate gestures that is detectable by the AR engine.

In some implementations, the administrator can add, or request to add, features to the virtual 3D representation, such as props, and the like. Such requests may be made, for example, using an administrator console associated with the online storefront.

As the administrator manipulates the equipment of the virtual imaging studio for editing the 3D representation, a preview of the edited content item may be displayed (persistently or on demand) on a display device that is viewable by the administrator. For example, a live preview of a dynamically changing content item from the perspective of a virtual camera may be provided on a display device for viewing by the administrator. If the administrator moves the virtual camera or makes edits to the 3D representation, a live feed associated with the virtual camera shows the resulting changes to the selected content item (i.e., the selected 2D image). In particular, the live preview may be provided in place of the selected content item in the graphical user interface associated with the online storefront. This enables the administrator to view and manipulate a scene comprising a 3D representation of the selected content item and the virtual image studio in AR while simultaneously previewing the output of edits of the content item within the context and layout of the online storefront.

Once the administrator has finished editing the 3D representation of the selected content item, the AR engine is configured to convert the edited 3D representation to a corresponding 2D version. The completion of edits of the content item in AR may be detected automatically by the AR engine, or it may be determined based on user input by the administrator. For example, the AR engine may receive the administrator's selection of a user interface element, provided on a real or virtual display interface, for indicating completion of content edits. As another example, the AR engine may be configured to recognize defined gesture(s) that correspond to completion of content edits (e.g., a unique swipe or other hand/finger gesture).

The converted 2D version, i.e., the edited 2D image, is prepared for rendering as a replacement of the selected image in a graphical user interface associated with the merchant storefront. That is, the edited 2D image is for presenting, in AR, on the GUI of the merchant storefront in place of the selected image. The edited 2D image represents a view of the edited 3D representation of the content item from the perspective of a virtual camera associated with the virtual imaging studio. The replacement of the selected image in the GUI may be done in real-time, e.g., responsive to administrator's indicating completion of content edits. In this way, an image (and more generally, a media content item) shown, in AR, in a merchant's online storefront may be edited and updated in situ, with a replacement image representing the administrator's edits to the selected image being output in real-time.

Reference is first made to FIG. 1 which illustrates, in block diagram form, an example system 200 for managing graphical user interfaces in augmented reality. As shown in FIG. 1, the system 200 may include user devices 210, AR devices 220, an application server 230, an AR engine 240, and a network 250 connecting one or more of the components of system 200.

The user devices 210, the AR devices 220, the application server 230, and the AR engine 240 may all communicate via the network 250. In at least some embodiments, each of the user devices 210, the AR devices 220, and the application server 230 may be a computing system or device. The user device 210 may take various forms such as, for example, a mobile communication device such as a smartphone, a tablet computer, a wearable computer (such as smart glasses, augmented reality/mixed reality headset, etc.), a laptop or desktop computer, or a computing device of another type.

The AR device 220 is a computing device that is adapted for providing an augmented reality experience. Specifically, the AR device 220 is configured to combine real world and computer-generated content, by augmenting a view of a real-world environment with virtual overlay data. The AR device 220 may take various forms such as an optical see-through display, a video see-through display, a handheld device (e.g., a smartphone), or the like. As shown in FIG. 1, the AR device 220 includes certain sensors, such as a camera 222, that can be used to collect sensor data. The sensors of the AR device 220, which may include, for example, cameras, LiDAR scanners, microphones, eye trackers, hand trackers, and the like, may be configured to capture data for use in generating AR scenes of real-world environments. A user may capture live image or video data depicting their real-world surrounding space using their AR device 220, and the captured image/video data may be overlaid with computer-generated information to generate AR scenes depicting the real-world space. Using their AR device 220, a user can view, edit, manipulate, and otherwise interact with AR scenes featuring various objects of interest. In particular, the AR device 220 and associated sensors may be configured to detect, capture, and recognize user input, such as speech, gestures, and the like, as a user interacts with an AR environment.

The application server 230 is a computing system that generates and/or provides content items associated with an application. In some embodiments, the application server 230 may be associated with web browser or web development software. In particular, the application server 230 may comprise a backend server that provides content items for display via graphical user interfaces associated with web browser/development software. For example, the application server 230 may be a backend of a website builder tool that is used for editing web content.

The application server 230 may process user requests to update content of websites, such as requests to add, delete, or modify media content items for display on web pages. For example, the application server 230 may receive a content modification request that includes a selection of a content item (e.g., a product photo) in a web page, one or more replacement content items (e.g., an edited version of the product photo), and instructions for modifying and/or replacing the selected content item. Content modification requests may be received via user devices 210, the AR devices 220, and/or the AR engine 240. The application server 230 may be configured to update, or cause to be updated, the content of a web page based on processing content modification requests for the web page.

An AR engine 240 is provided in the system 200. The AR engine 240 may be a software-implemented component containing processor-executable instructions that, when executed by one or more processors, cause a computing system to carry out some of the processes and functions described herein. In some embodiments, the AR engine 240 may be provided as a stand-alone service. In particular, a computing system may engage the AR engine 240 as a service that facilitates providing an AR experience for users of the AR devices 220.

The AR engine 240 supports generation of AR content, such as AR scenes of real-world spaces. The AR engine 240 is communicably connected to one or more AR devices 220. Sensor data from AR devices 220 may be used in generating AR scenes. For example, AR devices 220 may transmit captured camera and LiDAR scanner data directly to the AR engine 240, or camera/LiDAR scanner data from AR devices 220 may be received at the AR engine 240 via an intermediary computing system. The AR scene data generated by the AR engine 240 may be transmitted, in real-time, to the AR device 220 for viewing thereon. For example, the AR engine 240 may be configured to generate and transmit, to the AR device 220, virtual overlay data associated with AR scenes.

As shown in FIG. 1, the AR engine 240 may include a 3D modeling module 242, an image analysis module 244, and an AR scene generation module 246. The modules may comprise software components that are stored in a memory and executed by a processor to support various functions of the AR engine 240.

The 3D modeling module 242 can be configured to perform operations for constructing, editing, storing, and manipulating 3D models of subjects. A subject may be a person, a physical item, or a real-world space. The 3D modeling module 242 may obtain subject information (e.g., image and video data, measured range/depth data, etc.) and generate a virtual 3D representation of the subject based on the obtained information. Additionally, or alternatively, the 3D modeling module 242 may be configured to store and/or retrieve 3D models of subjects. By way of example, the 3D modeling module 242 may query one or more databases storing 3D model data of various subjects to obtain model data, such as graphical or mathematical data representation, for a specific subject.

The image analysis module 244 can be configured to analyze images stored and/or received by the AR engine 240. The image analysis module 244 receives images, videos, and the like as input, and outputs information regarding the image. Various algorithms may be included in or implemented by the image analysis module 244; non-limiting examples of such algorithms include: object recognition algorithms, image segmentation algorithms; surface, corner, and/or edge detection algorithms; and motion detection algorithms. In particular, the image analysis module 244 can detect objects in images and identify features of the detected objects.

The AR scene generation module 246 can be configured to generate AR scenes by combining real and virtual (i.e., computer-generated) information. For example, the AR scene generation module 246 may obtain a 3D model of a real-world space (e.g., a room, hallway, etc.) and overlay the 3D model onto the real-world space using AR. The AR scene generation module 246 determines how to align the 3D model with the real-world space. AR scenes containing the aligned model can be provided by the AR scene generation module 246, for example, via AR-enabled computing devices (e.g., head-mounted displays).

The user device 210, the AR devices 220, and the application server 230 may be in geographically disparate locations. Put differently, the user device 210 may be remote from one or more of the AR devices 220 and the application server 230.

The network 250 is a computer network. In some embodiments, the network 250 may be an internetwork such as may be formed of one or more interconnected computer networks. For example, the network 250 may be or may include an Ethernet network, an asynchronous transfer mode (ATM) network, a wireless network, or the like.

In some example embodiments, the AR engine 240 may be integrated as a component of an e-commerce platform. That is, an e-commerce platform may be configured to implement example embodiments of the AR engine 240. More particularly, the subject matter of the present application, including example methods for constructing 3D models and generating AR scenes disclosed herein, may be employed in the specific context of e-commerce.

Figure 2:
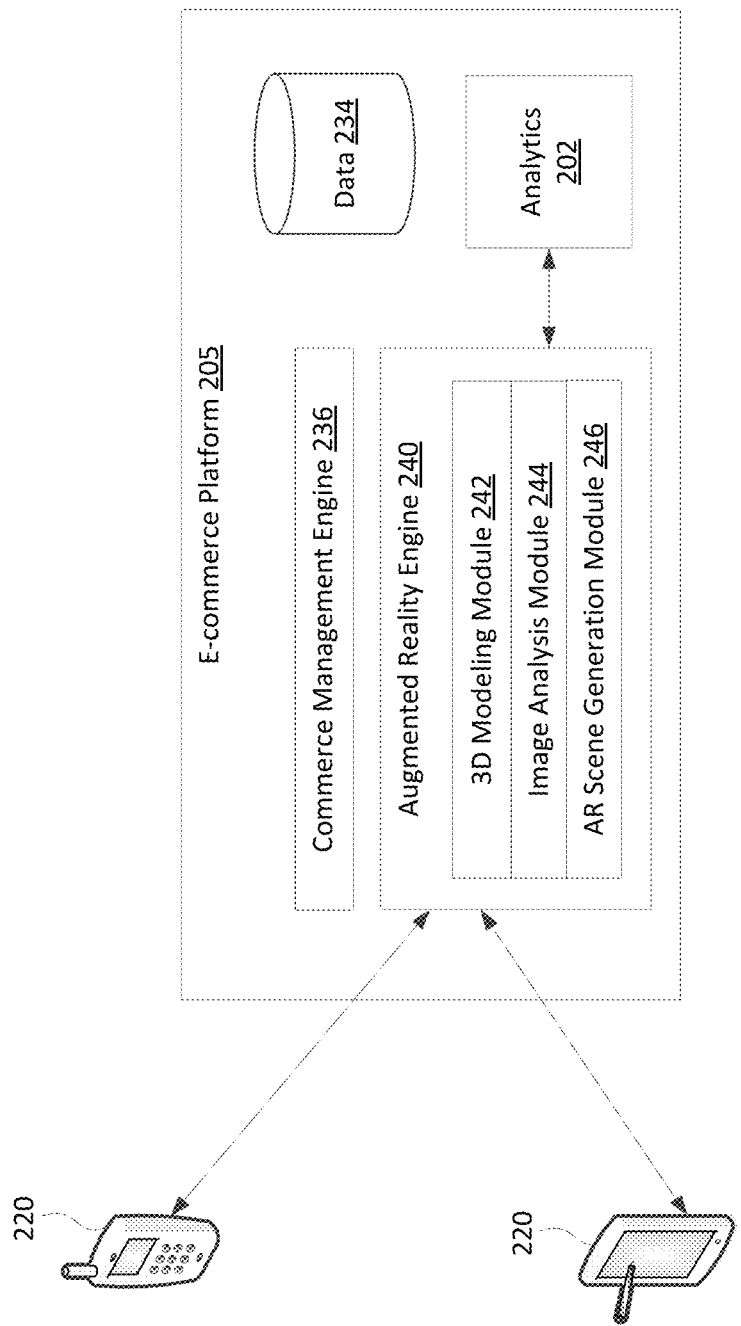
FIG. 2 is a block diagram of an e-commerce platform that is configured for implementing example embodiments of the AR engine of FIG. 1.

Reference is made to FIG. 2 which illustrates an example embodiment of an e-commerce platform 205 that implements an AR engine 240. The AR devices 220 may be communicably connected to the e-commerce platform 205. In at least some embodiments, the AR devices 220 may be associated with accounts of the e-commerce platform 205. Specifically, the AR devices 220 may be associated with individuals that have accounts in connection with the e-commerce platform 205. For example, AR devices 220 may be associated with customers (e.g., customers having e-commerce accounts) or merchants having one or more online stores in the e-commerce platform 205. The e-commerce platform 205 may store indications of associations between AR devices and customers or merchants of the e-commerce platform, for example, in the data facility 234.

The e-commerce platform 205 includes a commerce management engine 236, an AR engine 240, a data facility 234, and a data store 202 for analytics. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts.

The functionality described herein may be used in commerce to provide improved customer or buyer experiences. The e-commerce platform 205 may implement the functionality for any of a variety of different applications, examples of which are described herein. Although the AR engine 240 of FIG. 2 is illustrated as a distinct component of the e-commerce platform 205, this is only an example. An engine could also or instead be provided by another component residing within or external to the e-commerce platform 205. In some embodiments, one or more applications that are associated with the e-commerce platform 205 may provide an engine that implements the functionality described herein to make it available to customers and/or to merchants. Furthermore, in some embodiments, the commerce management engine 236 may provide that engine. However, the location of the AR engine 240 may be implementation specific. In some implementations, the AR engine 240 may be provided at least in part by an e-commerce platform, either as a core function of the e-commerce platform or as an application or service supported by or communicating with the e-commerce platform. Alternatively, the AR engine 240 may be implemented as a stand-alone service to clients such as a customer's AR device. For example, an AR device could store and run an engine locally as a software application.

The AR engine 240 is configured to implement at least some of the functionality described herein. Although the embodiments described below may be implemented in association with an e-commerce platform, such as (but not limited to) the e-commerce platform 205, the embodiments described below are not limited to e-commerce platforms.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data is obtained on the basis of inputs received via AR devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-A-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 3:
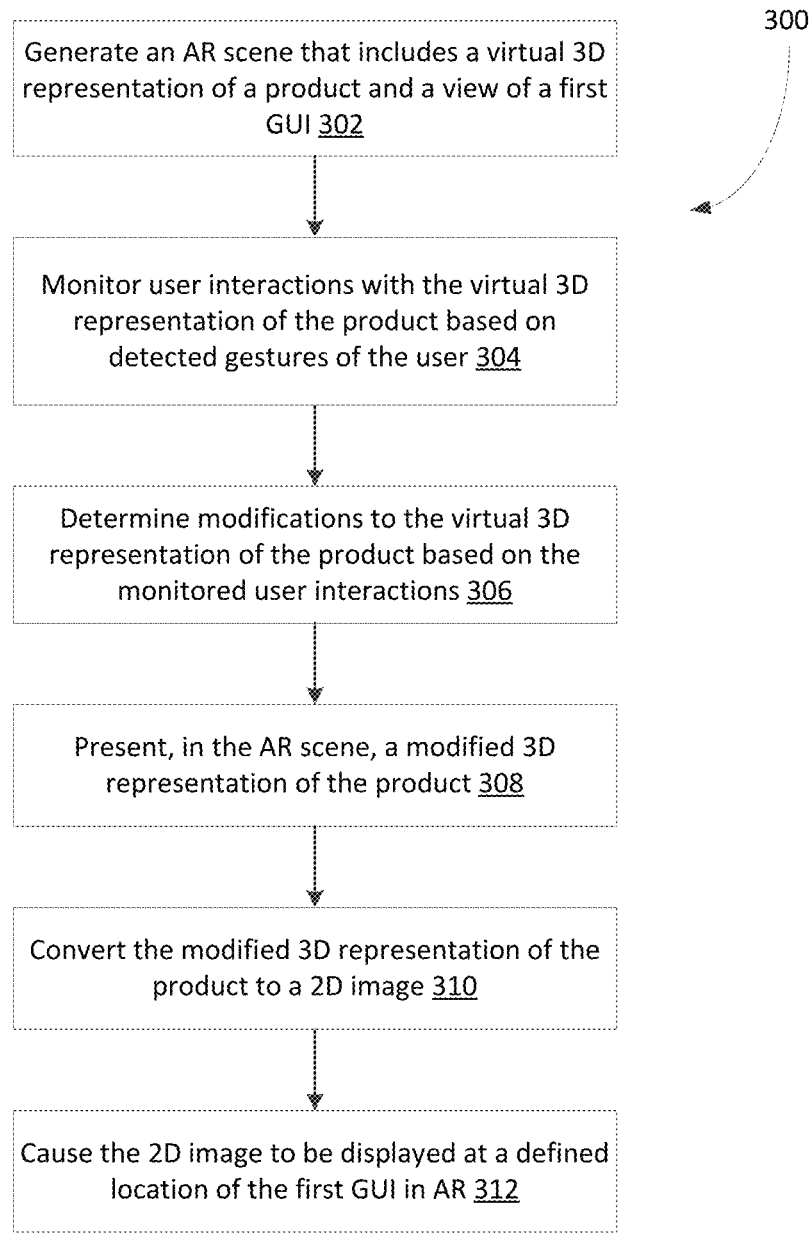
FIG. 3 shows, in flowchart form, an example method for editing content items within a graphical user interface in AR.

Reference is now made to FIG. 3, which shows, in flowchart form, an example method 300 for editing content items within a graphical user interface in AR. Specifically, the method 300 may facilitate editing of content items in documents, such as web pages, that are viewable in AR. The method 300 may be performed by a computing system that supports generation of AR content, such as the AR engine 240 of FIG. 1. As detailed above, an AR engine may be a service that is provided within or external to an e-commerce platform. The operations of method 300 may be implemented as part of functionalities of document editing software.

AR-enabled computing devices ("AR devices") may be used to visualize a real-world space. Using an AR device, a user can view real and virtual display devices and contents displayed thereon. For example, the user may be positioned in front of a real display device, such as a TV, a computer monitor, etc., when using the AR device, and the real display device may be located within a field of view of the AR device. A real display device renders information on a real output interface for viewing in the real world. Specifically, a real display device may output display data such as graphical representations of content items that the user can view, select, edit, manipulate, or otherwise interact with. The content items may, for example, be part of a document that is presented via a graphical user interface (e.g., web browser) on the real display device. Unlike real display devices, a virtual display device comprises a display interface that is virtually represented in AR. Virtual display devices may present virtual, or computer-generated, information in 2D or 3D. In particular, content items may be provided as virtual overlays on displayable areas of virtual display devices in AR.

The user may select a content item that is displayed on a real or virtual display device. The selected content item may be a media content item (e.g., a photo, video, etc.) that depicts a particular product. That is, the selected content item may be associated with an identifiable product. The content item may be selected by the user when the user desires to modify or replace the content item in a displayed document. The selection may be made directly from a graphical user interface provided on the display device, or it may be made via an administration interface for the displayed document, such as an administrator console. The user can select the content item by any one of the following: a touch input on a touch-sensitive input interface of a real display device; a selection using an input device (such as a mouse, stylus, etc.) associated with a real display device; a gesture for interacting with the content item as it is displayed on a virtual display device in AR; and the like.

The AR engine receives the user's selection of the content item. The selection may be transmitted to the AR engine as part of a content modification request for modifying a content item depicting an identifiable product. In operation 302, the AR engine generates an AR scene that includes a virtual 3D representation of the product and a view of the graphical user interface, e.g., on a real or virtual display device. The AR scene presents, at least partially, a 3D version of a scene that is depicted in the selected content item (e.g., a 2D image). In at least some embodiments, the virtual 3D representation may include a 3D model of the product. The 3D model may, for example, comprise a surface model that digitally represents 3D surfaces of the product.

A user can interact with the 3D model in AR. For example, the 3D model may be editable—the user may manipulate a virtual 3D object associated with the model to modify its appearance, size, position, orientation, etc. using gestures or input devices. The view of the graphical user interface shows a document (e.g., a web page) that is currently displayed on the graphical user interface and from which the selection of the content item is made. The user may concurrently view and interact with the document containing the selected content item and the virtual 3D representation of the product in AR. The AR scene may be generated, in operation 302, responsive to the user's selection of the content item within the graphical user interface.

In some embodiments, the AR scene may include a virtual representation of a studio environment, such as a photo studio. The virtual 3D representation of the product may be presented in the virtual studio environment in AR. In particular, a 3D model of the product may be viewable in AR as being positioned inside the virtual studio environment. By rearranging or otherwise manipulating components of the studio environment and/or the 3D model of the product, the AR scene can be altered. A replacement for the selected content item may then be obtained based on the altered AR scene.

Figure 7A:
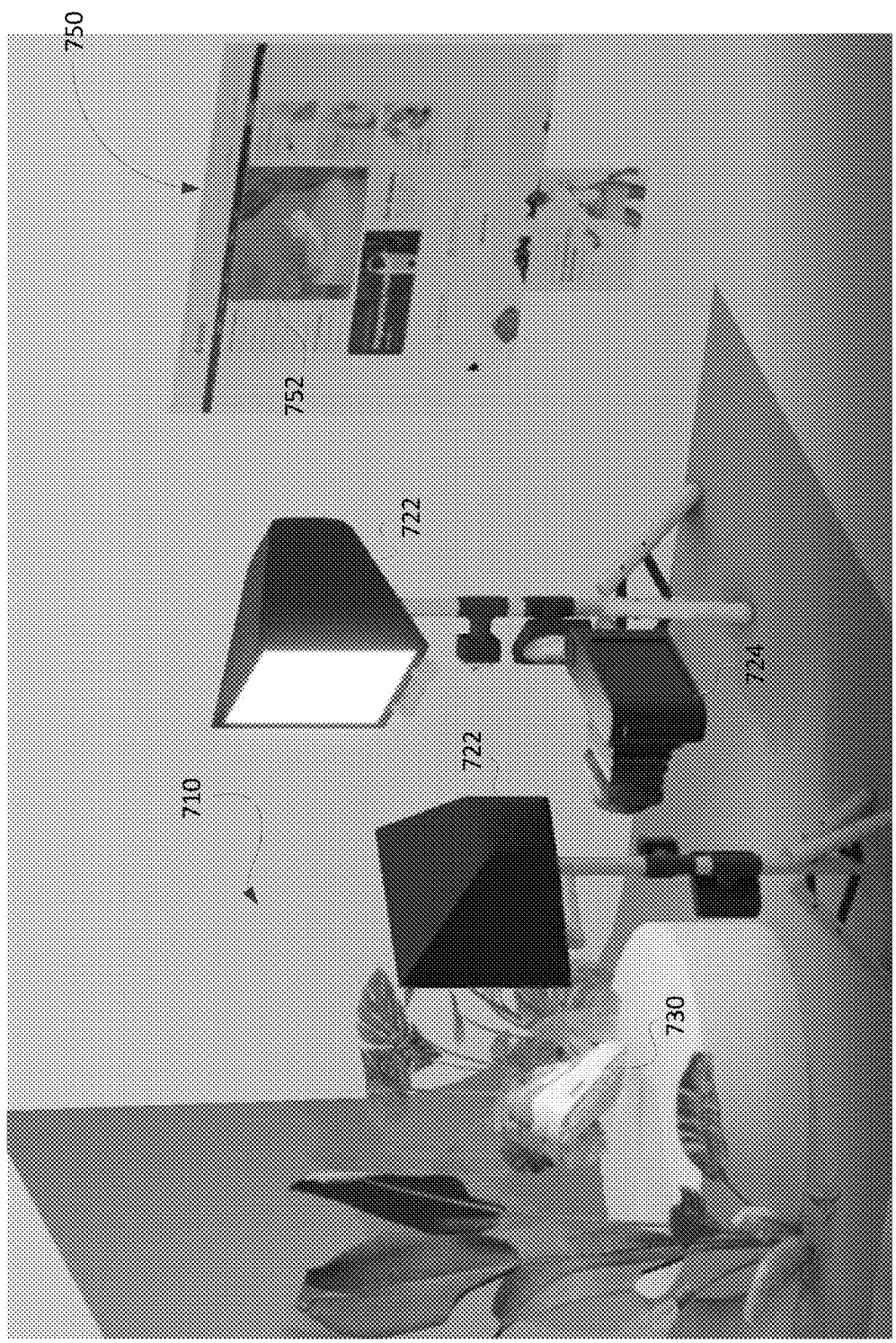
FIG. 7A illustrates an example AR scene including a real-world view of a graphical user interface and a virtual representation of a photo studio.

FIG. 7A shows an example AR scene 700 that includes a view of a graphical user interface 750 and a virtual representation of a photo studio. A web page is shown as being displayed in the graphical user interface 750. The web page may contain a plurality of content items, such as images, audio, video, animations, text, etc. The AR scene 700 may be provided, for example, by an AR engine in response to detecting, or receiving, user selection of a content item 752 within the graphical user interface 750. In particular, the virtual photo studio 710 may be launched and displayed in AR responsive to user selection of the content item 752, or some other defined trigger action in connection with the graphical user interface 750. The virtual photo studio 710 may include, at least, one or more virtual lighting devices 722 (e.g., virtual soft box lights) and a virtual camera 724. The virtual photo studio 710 may additionally include virtual 3D renders of props, equipment (e.g., tripod, green screen, etc.), and other items that are depicted in the selected content item.

The AR scene 700 depicts a product 730 (a shoe, in the example of FIG. 7A). In particular, the AR scene 700 includes a virtual 3D representation of the product 730. The product 730 may be positioned at a default location within the virtual photo studio 710. The virtual camera 724 is positioned adjacent to and oriented to be aimed at the virtual 3D representation of the product 730. In this way, images corresponding to photos from the virtual camera 724 would depict the virtual 3D representation of the product 730. As illustrated in FIG. 7A, the graphical user interface 750 and the virtual photo studio 710 are concurrently viewable in the AR scene 700.

Further, the virtual photo studio 710 and the 3D representation of the product 730 are on a desk tabletop in AR. Specifically, if the selected content item is rendered on a display device, such as a real or virtual monitor, that is disposed on a desk tabletop in front of the user, the virtual photo studio 710 and a 3D model of the product 730 may be viewed on the desk tabletop in AR. The desk tabletop represents an intuitive location for the virtual photo studio 710 and the 3D model of the product 730 relative to the user's position. This arrangement may conveniently allow the user to manipulate components of the virtual photo studio 710 and/or the 3D model of the product 730 for editing the selected content item while simultaneously previewing an output of edits of the content item on the display device, since the virtual photo studio 710 and the display device would both be in the user's field of view in AR.

In some embodiments, the virtual photo studio 710 may comprise one or more manipulable 3D objects and no other studio elements. In particular, the virtual photo studio 710 may include only a 3D representation of an object, such as a product 730, that is featured in the content item 752. By launching the virtual photo studio 710, a user may be able to manipulate the 3D representation of the object, for example, by manually re-orienting, relocating, and/or resizing the 3D representation in AR.

Figure 7B:
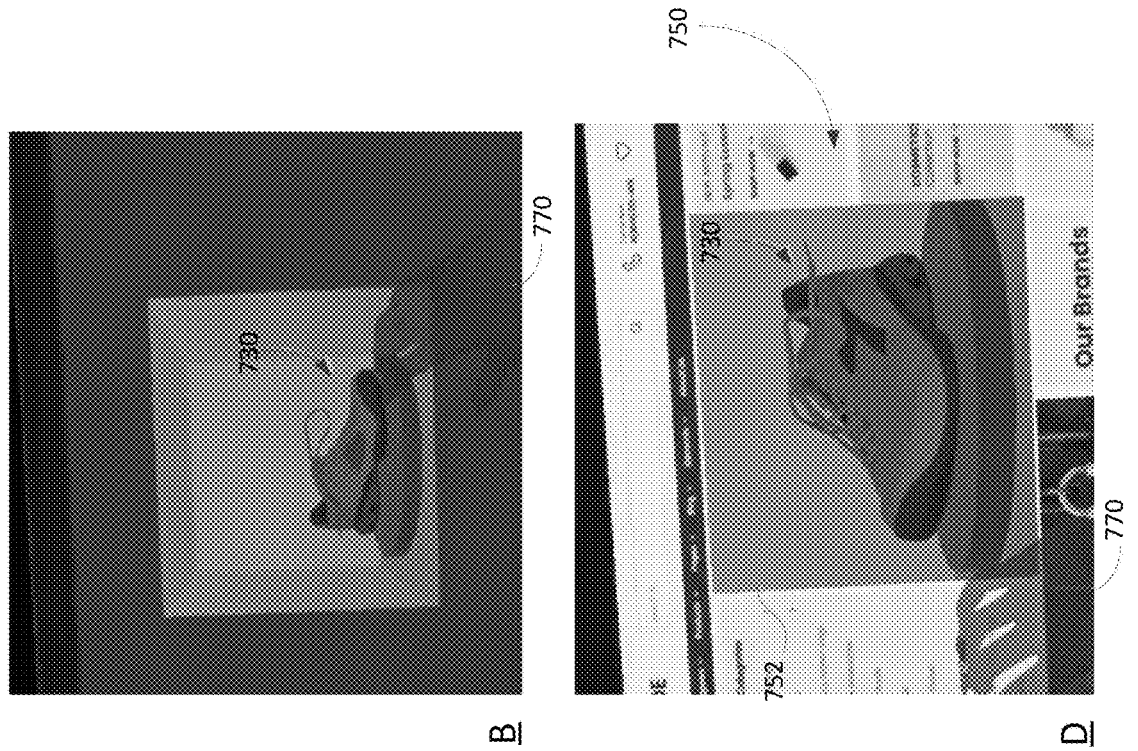
FIG. 7B illustrates an example of in situ interaction with content items displayed on a graphical user interface.
Figure 7B:
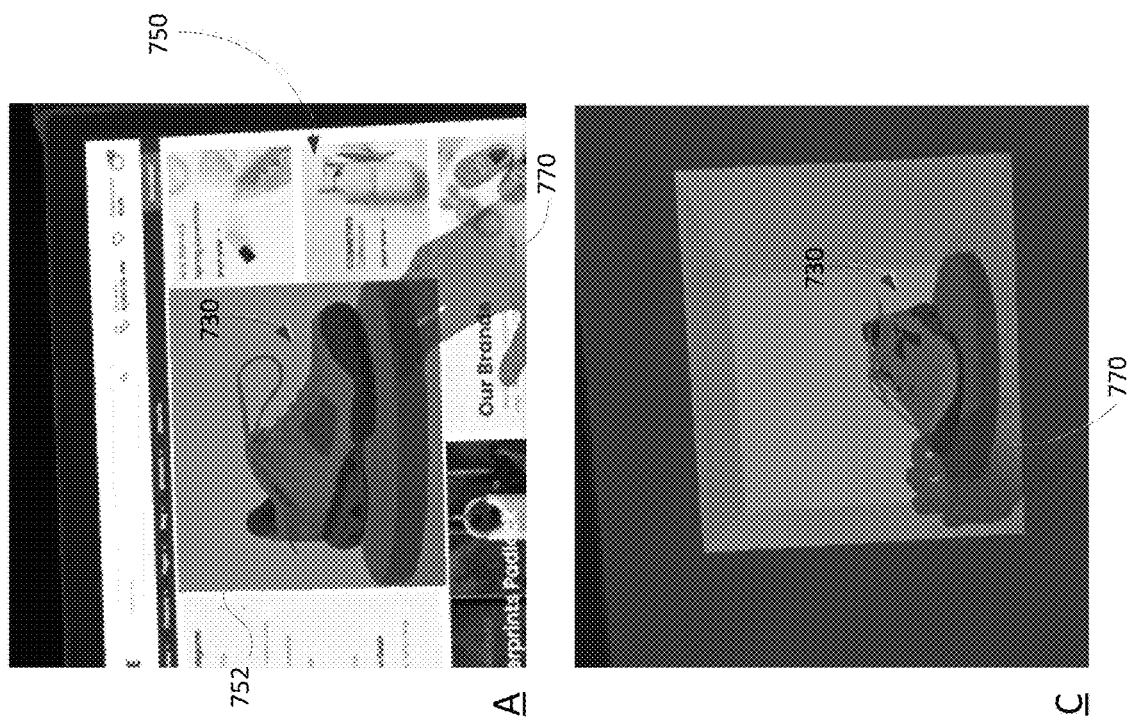

FIG. 7B illustrates an example of in situ editing of a content item that is displayed on a graphical user interface. As shown in diagram A, a content item 752, such as a product image of a product 730, may be displayed on a graphical user interface 750 of a web browser application. The content item 752 may for example, be part of a product webpage for the product. In AR, a virtual photo studio 710 may be embedded in the product webpage such that it may be launched based on user interaction with the webpage as displayed on the graphical user interface 750. Display of the virtual photo studio 710 may be toggled on or off depending on a user's actions for interacting with the graphical user interface 750. For example, if a user's hand 770 is detected to be within a defined distance from or in contact with the content item 752 as displayed on the graphical user interface 750 in AR, the virtual photo studio 710 may be launched to enable direct, or in situ, editing of the scene depicted in the content item 752 (diagram B). In particular, the virtual photo studio 710 may be displayed in isolation from the product webpage and the graphical user interface 750.

As shown in diagrams B and C of FIG. 7B, the user may manipulate a 3D representation of the product 730 depicted in the content item 752 by, for example, re-orienting, relocating, and/or resizing the 3D representation of the product 730 in the virtual photo studio 750. The user's hand 770 may be tracked and based on sensor data indicating movement and gestures of the hand 770, the 3D representation of the product 730 may be modified accordingly.

Upon completion of edits to the scene, the virtual photo studio 750 can be exited to return to the display of the product webpage on the graphical user interface 750. The virtual photo studio 750 may be exited automatically or in response to user input for indicating completion of the edits. For example, if the user's hand 770 is detected to move away from the virtual photo studio 710 or to perform a defined gesture, the virtual photo studio 710 may be exited. As another example, the virtual photo studio 710 may be exited if the user selects a user interface element for signalling that in situ editing of the scene is complete. An image of the modified 3D representation of the product 730 may then be displayed in place of the previous image of the product 730 on the graphical user interface 750 (diagram D).

In some embodiments, the AR engine may compare image data associated with the selected content item (e.g., a 2D image) and metadata associated with a plurality of 3D virtual scenes. The metadata corresponding to virtual scenes may, for example, be stored in a data store that is accessible by the AR engine. Based on the comparisons, the AR engine may determine a match (for example, using computer vision or image recognition) between the image data and metadata of a first one of the 3D virtual scenes. The AR scene of operation 302 may be generated based on the metadata of this first 3D virtual scene.

The AR engine monitors user interactions with the virtual 3D representation of the product based on detected gestures of the user, in operation 304. For example, the AR engine may be configured to detect user actions, such as translation, rotation, scaling, etc., for manipulating a 3D model of the product in AR. Additionally, or alternatively, the AR engine may monitor user interactions with other components of the AR scene, which may include equipment (e.g., one or more virtual cameras, lighting devices, etc.) of a virtual studio.

In at least some embodiments, the AR engine may obtain sensor data of sensors for tracking gestures of the user in the real-world environment, and user interactions with the virtual 3D representation of the product may be detected based on the obtained sensor data. In particular, the user interactions may comprise gestures of the user which may be identified based on the sensor data. The sensors may comprise one or more of cameras, LiDAR array, eye trackers, hand trackers, and the like. The AR engine may be configured to retrieve the sensor data in real-time by, for example, querying data stores associated with the sensors. The sensors may be associated with the AR device, or they may be disposed in a surrounding environment of the AR device and/or the display device (real or virtual) on which the graphical user interface is rendered. For example, the sensors may be built-in components of the AR device, and sensor data may be collected during use of the AR device. Additionally, or alternatively, the sensors may be part of equipment that is set up at different locations in a proximity of the AR device or the display device in the real world.

In operation 306, the AR engine determines modifications to the virtual 3D representation of the product based on the monitored user interactions. The gestures of the user (e.g., drag, tap, swipe, pinch, rotate, etc.) for manipulating components of the AR scene can be detected and associated with corresponding effects on the 3D version of the scene that is depicted in the selected content item. For example, the user's interactions with equipment of the virtual studio may be mapped to specific effects that are desired to be produced for the selected content item. Such effects may include: adjusted lighting conditions, corresponding to changes in position or orientation of virtual lighting devices; repositioning of a 3D model of the product; changes in position or orientation of a virtual camera; and the like. Each user interaction for producing a desired image effect may be associated with a set of detected gestures. For example, the repositioning of a 3D model of a product may be associated with a series of grab, drag, and rotate gestures that is detectable by the AR engine.

As the user manipulates components of the AR scene, the AR engine presents a modified 3D representation of the product for viewing in AR (operation 308). For example, the user interactions with the 3D model of the product may result in changes to at least one of position, orientation, or scale of the 3D model in the AR scene. The modified 3D representation of the product may be presented in real-time, or near real-time. In particular, the AR engine may update, or cause to be updated, the 3D representation of the product in real-time responsive to user interactions with the AR scene and components thereof.

Additionally, the AR engine may cause a preview of the edited content item to be displayed (persistently or on demand) on the graphical user interface that is viewable in AR. For example, a live preview of a dynamically changing content item from the perspective of a virtual camera may be provided on the graphical user interface. If the user moves the virtual camera or makes edits to the 3D representation of the product, a live feed associated with the virtual camera shows the resulting changes to the selected content item. In particular, the live preview may be provided in place of the selected content item in the graphical user interface associated. This enables the user to view and manipulate components of the AR scene while simultaneously previewing the output of edits of the content item within the context and layout of the document presented in the graphical user interface.

The AR engine converts the modified 3D representation of the product to a corresponding 2D image, in operation 310. The conversion may be performed responsive to detecting completion of edits of the 3D representation of the product (and more generally, manipulation of the AR scene). The completion of edits in AR may be detected automatically by the AR engine, or it may be determined based on user input. For example, the AR engine may receive the user's selection of a user interface element, provided on a real or virtual display interface, for indicating completion of content edits. As another example, the AR engine may be configured to recognize defined user gesture(s) that correspond to completion of content edits (e.g., a unique swipe or other hand/finger gesture).

In at least some embodiments, the AR engine is configured to obtain an image of the modified 3D representation of the product as output by a virtual camera associated with the AR scene. Accordingly, the AR engine may identify imaging effects on the 3D representation of the product corresponding to adjustments of the virtual camera by the detected gestures of the user.

In operation 312, the AR engine causes the 2D image to be displayed at a defined location of the first graphical user interface in AR. In at least some embodiments, the AR engine may cause the selected content item from the graphical user interface to be replaced with the 2D image converted from the modified 3D representation of the product. That is, the converted 2D image represents replacement content for the selected content item in the graphical user interface. The converted 2D image represents a view of the modified AR scene depicting the product from the perspective of a virtual camera. The replacement of the selected content item within the graphical user interface may be performed in real-time, e.g., responsive to user's indicating completion of content edits. In this way, a selected content item (e.g., a media content item) that is shown in a document presented on a graphical user interface may be edited and updated in situ, with a replacement content item representing the user's actual edits to a scene depicted in the selected content item being output in real-time. The converted 2D image may be transmitted, by the AR engine, to an AR device of the user, with instructions for displaying the 2D image as overlay on the graphical user interface. Additionally, the AR engine may transmit the converted 2D image to an application server associated with the document containing the selected content item, enabling the application server to update the content of the document using the converted 2D image.

Figure 4:
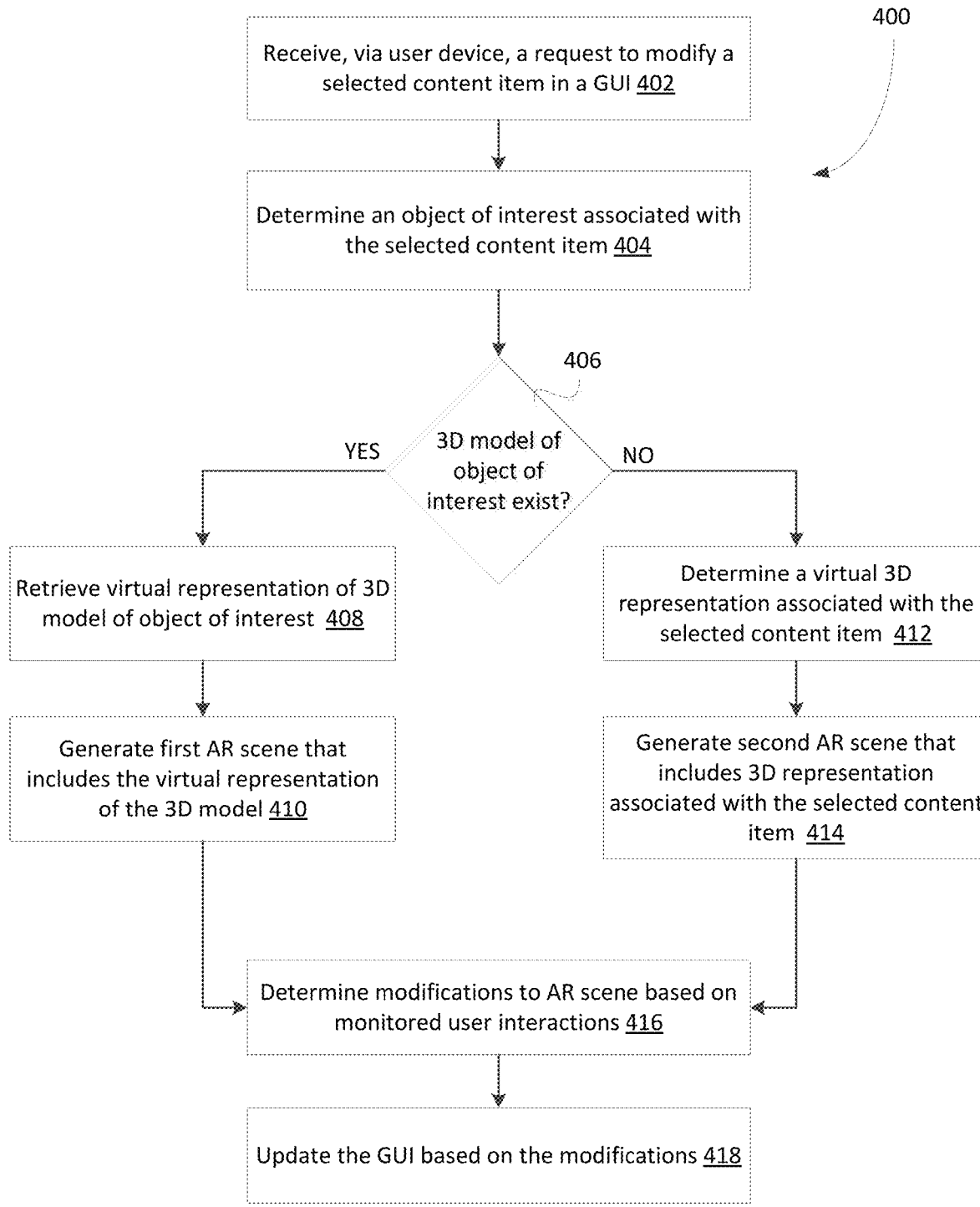
FIG. 4 shows, in flowchart form, an example method for processing requests to modify content items within a graphical user interface in AR.

Reference is now made to FIG. 4, which shows, in flowchart form, an example method 400 for processing requests to modify content items within a graphical user interface in AR. Specifically, the method 400 may facilitate manual editing of content items of documents, such as web pages, that are viewable in AR. The method 400 may be performed by a computing system that supports generation of AR content, such as the AR engine 240 of FIG. 1. As detailed above, an AR engine may be a service that is provided within or external to an e-commerce platform. The operations of method 400 may be implemented as part of functionalities of document editing software. The operations of method 400 may be performed in addition to, or as alternatives of, one or more operations of method 300.

In operation 402, the AR engine receives, via a user device, a request to modify a selected content item in a graphical user interface. The content modification request may include a user selection of a content item (e.g., a photo) in a displayed document such as a web page, one or more replacement content items (e.g., an edited version of the photo), and/or instructions for modifying and/or replacing the selected content item. The user may initiate the request by interacting directly with the graphical user interface or using an administrator console associated with the document for managing its content.

The AR engine determines an object of interest associated with the selected content item, in operation 404. In particular, the AR engine may analyze the selected content item in order to identify an object which may be prominently featured in the content item. For example, the object of interest may be a product that is depicted in a product photo displayed on a merchant's web page. The AR engine may identify an object of interest based on, for example, assessing metadata associated with the selected content item, and/or employing object detection techniques for analyzing the selected content item.

The AR engine determines whether a 3D model of the object of interest already exists and is accessible (operation 406). If a 3D model does exist, the AR engine retrieves a virtual representation of the 3D model of the object of interest, in operation 408. The 3D model may comprise a surface model that digitally represents 3D surfaces of the object of interest. The AR engine then generates a first AR scene that includes the virtual representation of the 3D model (operation 410). In at least some embodiments, the first AR scene may include a virtual studio (e.g., virtual photo studio) for rendering and editing scenes depicting the 3D model of the object of interest.

If, on the other hand, a 3D model of the object of interest does not exist, the AR engine determines a virtual 3D representation associated with the selected content item, in operation 412. In some embodiments, the AR engine may be configured to itself generate a 3D surface model associated with the object of interest. Alternatively, the AR engine may retrieve or obtain model data of a 3D model for a related or similar object to the object of interest. The AR engine generates a second AR scene that includes the 3D representation associated with the selected content item. The second AR scene may also include a virtual studio for rendering and editing scenes depicting the 3D model of the object of interest.

In operation 416, the AR engine determines modifications to the AR scene (either the first AR scene or the second AR scene) based on monitored user interactions. The user interactions may include, for example, direct manipulation of a 3D model of the object of interest or components of a virtual studio that is presented as part of the AR scene. The AR engine then updates the graphical user interface based on the modifications (operation 418). In particular, the selected content item may be replaced by a 2D image corresponding to the modified AR scene depicting the object of interest. This 2D image represents replacement content for the selected content item within the graphical user interface.

Figure 5:
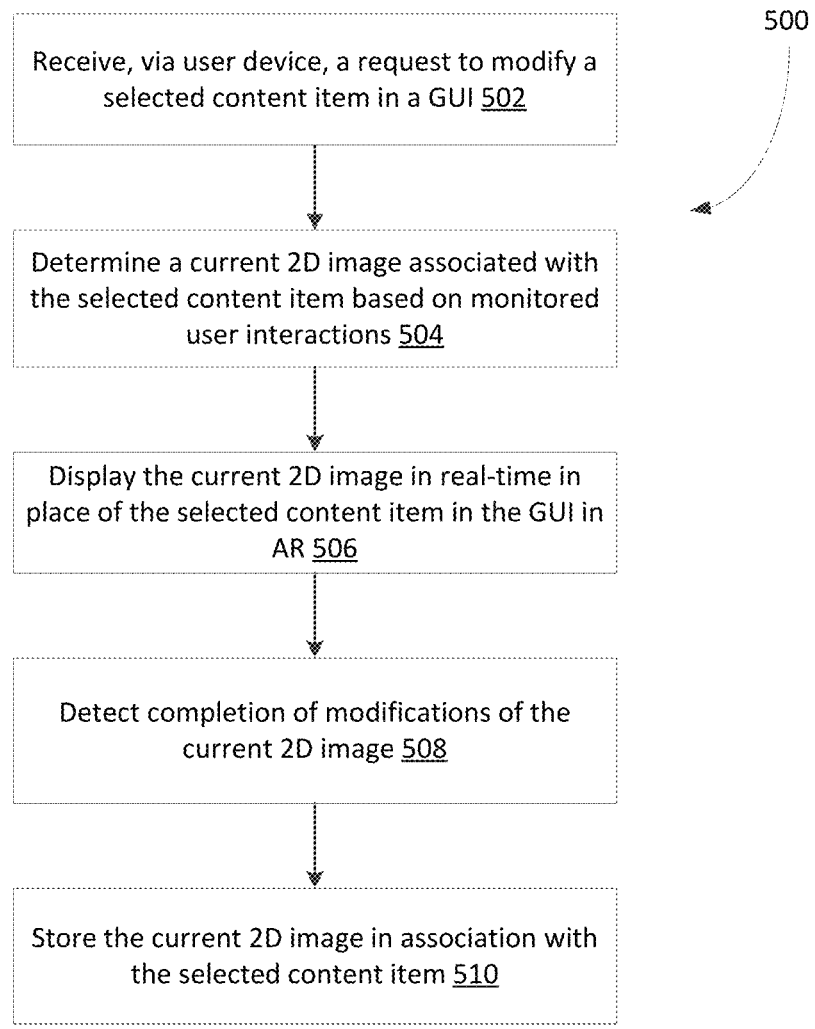
FIG. 5 shows, in flowchart form, an example method for updating a graphical user interface based on processing requests to modify 2D content items in AR.

Reference is now made to FIG. 5, which shows, in flowchart form, an example method 500 for updating a graphical user interface based on processing requests to modify 2D content items in AR. Specifically, the method 500 may facilitate manual editing of content items of documents, such as web pages, that are viewable in AR. The method 500 may be performed by a computing system that supports generation of AR content, such as the AR engine 240 of FIG. 1. As detailed above, an AR engine may be a service that is provided within or external to an e-commerce platform. The operations of method 500 may be implemented as part of functionalities of document editing software. The operations of method 500 may be performed in addition to, or as alternatives of, one or more of the operations of methods 300 and 400.

In operation 502, the AR engine receives, via a user device, a request to modify a selected content item in a graphical user interface. Responsive to receiving a content modification request, the AR engine may present an AR scene that includes a virtual studio for editing a scene depicted in the selected content item. The user can interact with the AR scene by, for example, directly manipulating components of the virtual studio and/or 3D models of subjects that are depicted in the scene.

The AR engine determines a current 2D image associated with the selected content item based on monitored user interactions. That is, as the user interacts with the AR scene, a current 2D image corresponding to an edited version of the scene depicted in the selected content item is maintained by the AR engine. In operation 506, the AR engine displays the current 2D image in real-time in place of the selected content item in the graphical user interface in AR. In this way, the graphical user interface may be updated in real-time in accordance with interactions of the user with the AR scene.

In operation 508, the AR engine detects completion of modifications of the current 2D image. The AR engine then stores the current 2D image in association with the selected content item, in operation 510.

Figure 6:
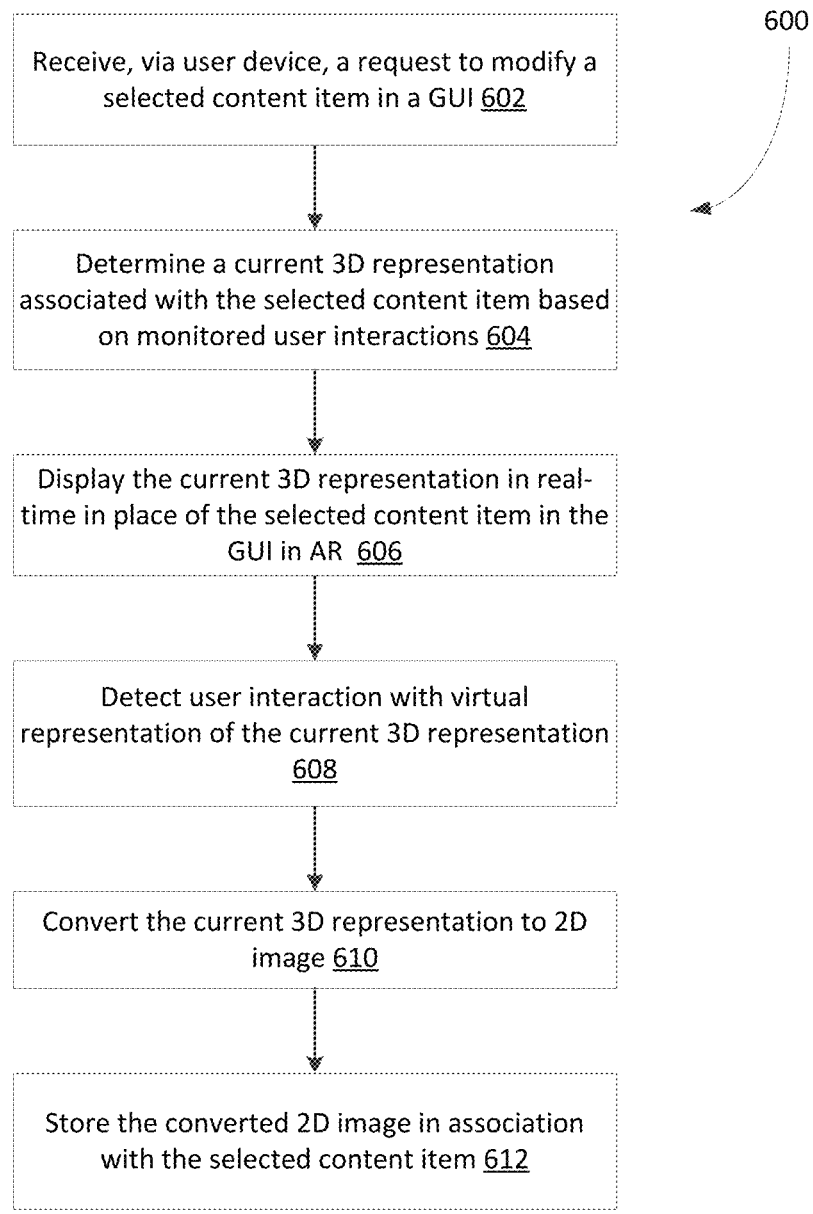
FIG. 6 shows, in flowchart form, an example method for updating a graphical user interface based on processing requests to modify 3D content items in AR.

Reference is now made to FIG. 6, which shows, in flowchart form, an example method 600 for updating a graphical user interface based on processing requests to modify 3D content items in AR. Specifically, the method 600 may facilitate manual editing of content items of documents, such as web pages, that are viewable in AR. The method 600 may be performed by a computing system that supports generation of AR content, such as the AR engine 240 of FIG. 1. As detailed above, an AR engine may be a service that is provided within or external to an e-commerce platform. The operations of method 600 may be implemented as part of functionalities of document editing software. The operations of method 600 may be performed in addition to, or as alternatives of, one or more of the operations of methods 300 to 500.

In operation 602, the AR engine receives, via a user device, a request to modify a selected content item in a graphical user interface. Responsive to receiving a content modification request, the AR engine may present an AR scene that includes a virtual studio for editing a scene depicted in the selected content item. The user can interact with the AR scene by, for example, directly manipulating components of the virtual studio and/or 3D models of subjects that are depicted in the scene.

The AR engine determines a current 3D representation associated with the selected content item based on monitored user interactions. That is, as the user interacts with the AR scene, a current 3D representation corresponding to an edited version of the scene depicted in the selected content item is maintained by the AR engine. In operation 606, the AR engine displays the current 3D representation in real-time in place of the selected content item in the graphical user interface in AR. In this way, the graphical user interface may be updated in real-time in accordance with interactions of the user with the AR scene.

In operation 608, the AR engine detects user interaction with a virtual representation of the current 3D representation. In addition to manipulating components of the virtual studio for modifying the depicted scene, the user may also be able to interact directly with the graphical user interface to effect changes to the visual appearance of the current 3D representation within the context of the graphical user interface in AR. For example, the user may perform transforms, such as translation, rotation, and scaling, of a 3D representation of an object of interest depicted in a scene associated with the selected content item by interacting with the 3D representation within the graphical user interface.

In operation 610, the AR engine converts the current 3D representation to a 2D image. The AR engine then stores the converted 2D image in association with the selected content item (operation 612).

Figure 8A:
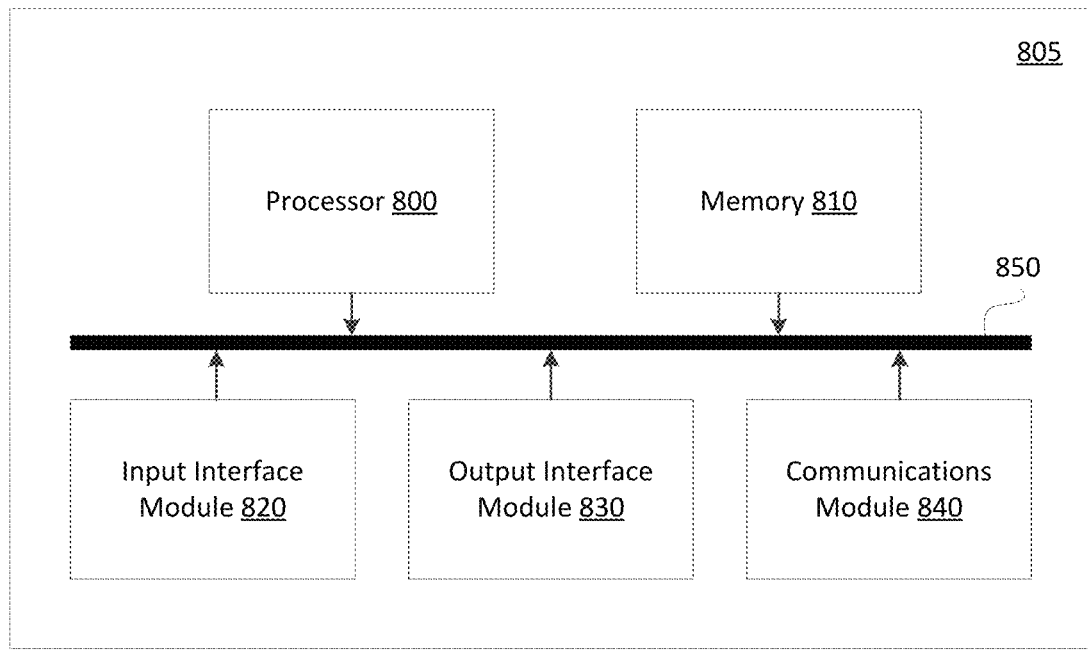
FIG. 8A is a high-level schematic diagram of an example computing device.

The above-described methods may be implemented by way of a suitably programmed computing device. FIG. 8A is a high-level operation diagram of an example computing device 805. The example computing device 805 includes a variety of modules. For example, as illustrated, the example computing device 805, may include a processor 800, a memory 810, an input interface module 820, an output interface module 830, and a communications module 840. As illustrated, the foregoing example modules of the example computing device 805 are in communication over a bus 850.

The processor 800 is a hardware processor. The processor 800 may, for example, be one or more ARM, Intel x86, PowerPC processors or the like.

The memory 810 allows data to be stored and retrieved. The memory 810 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 805.

The input interface module 820 allows the example computing device 805 to receive input signals. Input signals may, for example, correspond to input received from a user. The input interface module 820 may serve to interconnect the example computing device 805 with one or more input devices. Input signals may be received from input devices by the input interface module 820. Input devices may, for example, include one or more of a touchscreen input, keyboard, trackball or the like. In some embodiments, all or a portion of the input interface module 820 may be integrated with an input device. For example, the input interface module 820 may be integrated with one of the aforementioned examples of input devices.

The output interface module 830 allows the example computing device 805 to provide output signals. Some output signals may, for example allow provision of output to a user. The output interface module 830 may serve to interconnect the example computing device 805 with one or more output devices. Output signals may be sent to output devices by output interface module 830. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 830 may be integrated with an output device. For example, the output interface module 830 may be integrated with one of the aforementioned example output devices.

The communications module 840 allows the example computing device 805 to communicate with other electronic devices and/or various communications networks. For example, the communications module 840 may allow the example computing device 805 to send or receive communications signals. Communications signals may be sent or received according to one or more protocols or according to one or more standards. For example, the communications module 840 may allow the example computing device 805 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 840 may allow the example computing device 805 to communicate using near-field communication (NFC), via Wi-Fi™, using Bluetooth™ or via some combination of one or more networks or protocols. Contactless payments may be made using NFC. In some embodiments, all or a portion of the communications module 840 may be integrated into a component of the example computing device 805. For example, the communications module may be integrated into a communications chipset.

Software comprising instructions is executed by the processor 800 from a computer-readable medium. For example, software may be loaded into random-access memory from persistent storage of memory 810. Additionally, or alternatively, instructions may be executed by the processor 800 directly from read-only memory of memory 810.

Figure 8B:
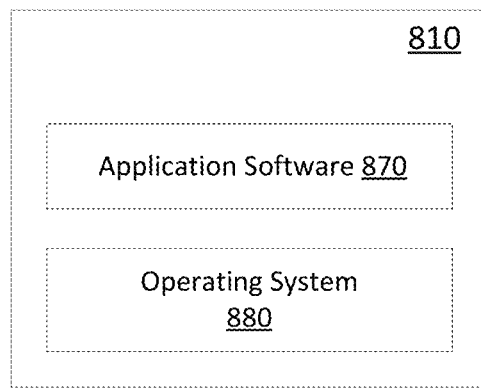
FIG. 8B shows a simplified organization of software components stored in a memory of the computing device of FIG. 8A.

FIG. 8B depicts a simplified organization of software components stored in memory 1010 of the example computing device 805. As illustrated these software components include an operating system 880 and application software 870.

The operating system 880 is software. The operating system 880 allows the application software 870 to access the processor 800, the memory 810, the input interface module 820, the output interface module 830, and the communications module 840. The operating system 880 may be, for example, Apple™ OS X, Android™, Microsoft™ Windows™, a Linux distribution, or the like.

The application software 870 adapts the example computing device 805, in combination with the operating system 880, to operate as a device performing particular functions.

Example E-Commerce Platform

Although not required, in some embodiments, the methods disclosed herein may be performed on or in association with an e-commerce platform. An example of an e-commerce platform will now be described.

Figure 9:
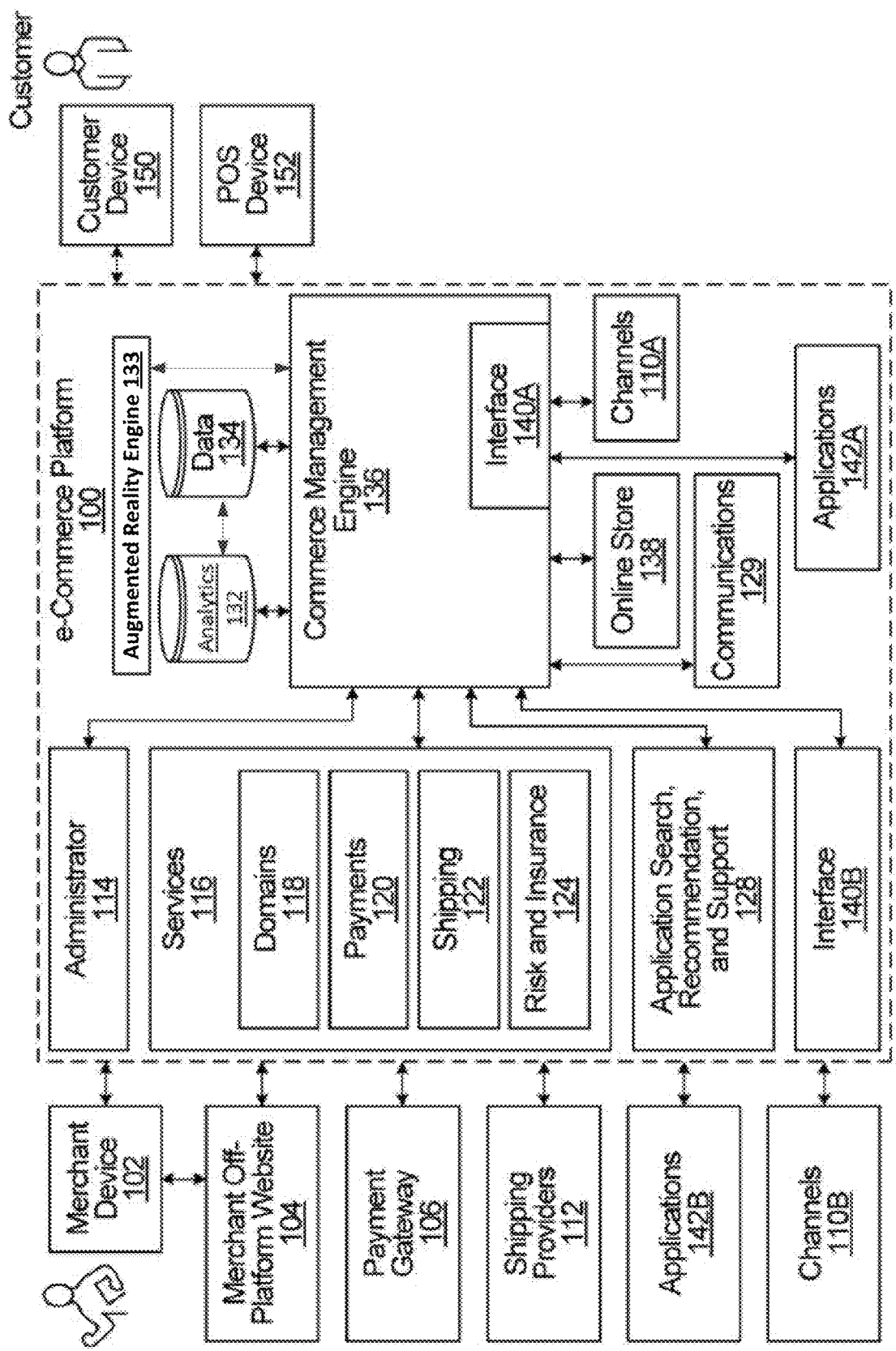
FIG. 9 is a block diagram of an e-commerce platform, in accordance with an example embodiment.

FIG. 9 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as an AR device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 9, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through a point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to AR devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 10:
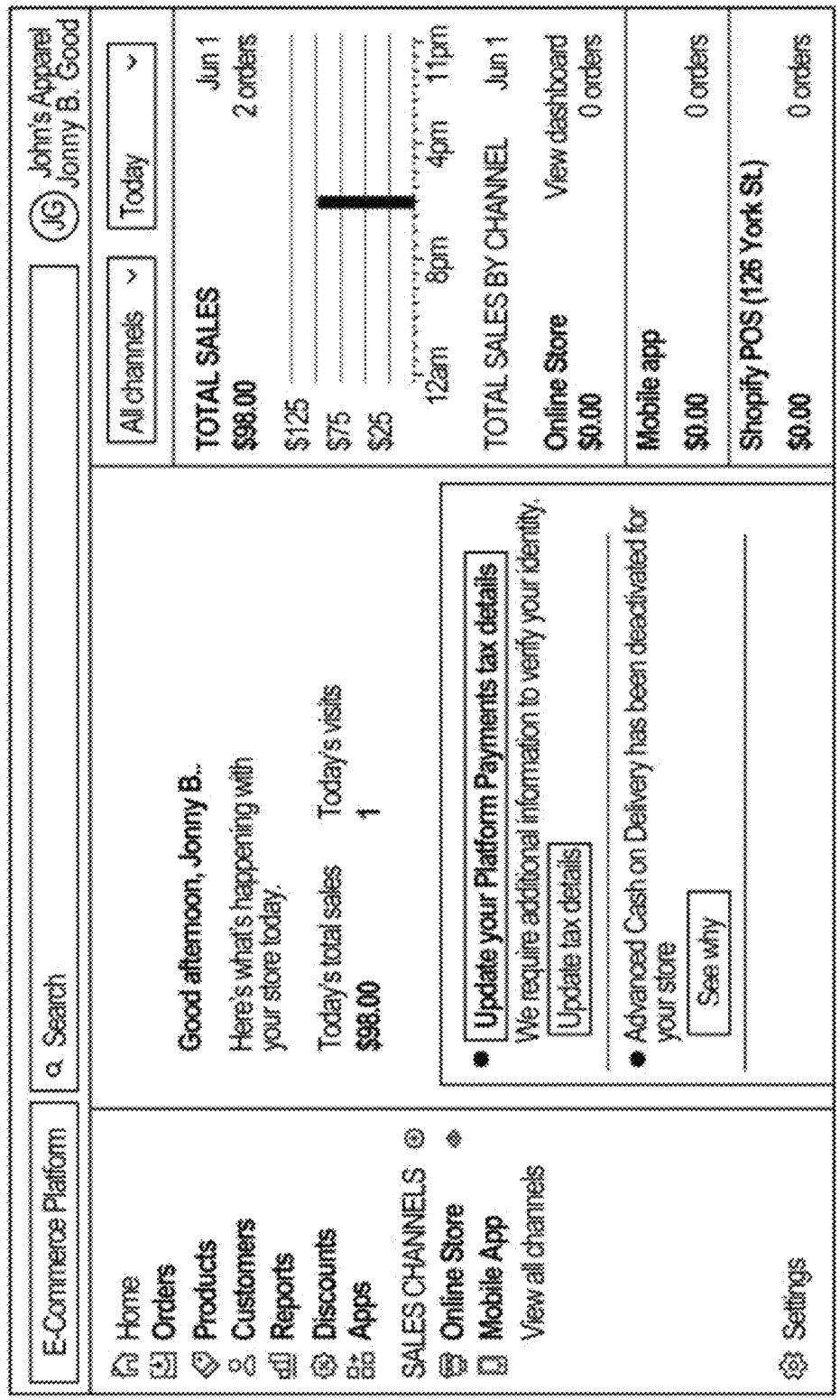
FIG. 10 is an example of a home page of an administrator, in accordance with an example embodiment.

FIG. 10 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 10. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 9, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

The e-commerce platform 100 may implement an augmented reality engine 133 which may be configured to support at least some of the functions of the AR engine 240 of FIG. 2 described above.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving a user request to edit a first two-dimensional (2D) image that is displayed on a first graphical user interface, the first 2D image depicting a product;
in response to receiving the user request to edit the first 2D image:
presenting, via an augmented reality (AR) device, an AR scene that includes a virtual 3D representation of the product and a view of the first graphical user interface;
monitoring user interactions with the virtual 3D representation of the product based on detected gestures of the user;
determining modifications of the virtual 3D representation of the product based on the monitored user interactions;
presenting, in the AR scene, a modified 3D representation of the product;
converting the modified 3D representation of the product to a second 2D image for replacing the first 2D image based on obtaining an image of the modified 3D representation of the product as output by a virtual camera associated with the AR scene; and
causing the first graphical user interface to be updated in real-time responsive to the monitored user interactions based on displaying the second 2D image in place of the first 2D image on the first graphical user interface in AR.

2. The method of claim 1, wherein the first graphical user interface is provided on a display device that is viewable in the AR scene.

3. The method of claim 1, wherein receiving the user request to edit the first 2D image comprises receiving at least one of: a touch input on a touch-sensitive interface; a selection using an input device such as a stylus; or a gesture for interacting with the first 2D image as displayed on a virtual display device.

4. The method of claim 1, further comprising:
comparing image data associated with the first 2D image and metadata associated with a plurality of 3D virtual scenes; and
determining a match between the image data associated with the first 2D image and metadata of a first one of the 3D virtual scenes, wherein the AR scene is generated based on the metadata of the first 3D virtual scene.

5. The method of claim 1, further comprising obtaining sensor data of sensors for tracking gestures of the user, wherein the gestures of the user are detected based on the obtained sensor data.

6. The method of claim 5, wherein the sensors comprise at least one of: cameras; LiDAR array; eye trackers; or hand trackers.

7. The method of claim 1, wherein the AR scene further includes a virtual representation of a camera that is positioned adjacent to the 3D representation of the product and wherein determining the modifications of the virtual 3D representation of the product comprises identifying imaging effects on the 3D representation of the product corresponding to adjustments of the camera by the detected gestures of the user.

8. The method of claim 7, wherein the adjustments of the camera include at least repositioning of the virtual representation of the camera.

9. The method of claim 1, further comprising transmitting, to an AR-enabled computing device, the first 2D image and instructions for displaying the first 2D image on the first graphical user interface.

10. The method of claim 1, further comprising detecting completion of modifications of the 3D representation of the product, wherein the modified 3D representation of the product is converted to the second 2D image responsive to detecting the completion of modifications.

11. The method of claim 1, further comprising, in response to receiving the user request to edit the first 2D image:
presenting a virtual studio environment in the AR scene, the virtual studio environment comprising a 3D model of a studio workbench for editing images, wherein the virtual 3D representation of the product is positioned at a default location within the virtual studio environment.

12. The method of claim 11, wherein the virtual studio environment and the virtual 3D representation of the product are viewable on a desk tabletop in AR.

13. The method of claim 11, wherein the virtual studio environment comprises virtual representations of one or more studio equipment in AR.

14. The method of claim 13, further comprising monitoring user interactions with the virtual representations of the studio equipment, wherein the modifications of the virtual 3D representation of the product are determined based on the monitored user interactions with the virtual representations of the product and the studio equipment.

15. A computing system, comprising:
a processor; and
a memory coupled to the processor, the memory storing processor-executable instructions that, when executed, are to cause the processor to:
receive a user request to edit a first two-dimensional (2D) image that is displayed on a first graphical user interface, the first 2D image depicting a product;
in response to receiving the user request to edit the first 2D image:
present, via an augmented reality (AR) device, an AR scene that includes a virtual 3D representation of the product and a view of the first graphical user interface;
monitor user interactions with the virtual 3D representation of the product based on detected gestures of the user;
determine modifications of the virtual 3D representation of the product based on the monitored user interactions;
present, in the AR scene, a modified 3D representation of the product;
convert the modified 3D representation of the product to a second 2D image for replacing the first 2D image based on obtaining an image of the modified 3D representation of the product as output by a virtual camera associated with the AR scene; and
cause the first graphical user interface to be updated in real-time responsive to the monitored user interactions based on displaying the second 2D image in place of the first 2D image on the first graphical user interface in AR.

16. The computing system of claim 15, wherein receiving the user request to edit the first 2D image comprises receiving at least one of: a touch input on a touch-sensitive interface; a selection using an input device such as a stylus; or a gesture for interacting with the first 2D image as displayed on a virtual display device.

17. The computing system of claim 15, wherein the instructions, when executed, are to further cause the processor to:
compare image data associated with the first 2D image and metadata associated with a plurality of 3D virtual scenes; and
determine a match between the image data associated with the first 2D image and metadata of a first one of the 3D virtual scenes, wherein the AR scene is generated based on the metadata of the first 3D virtual scene.

18. The computing system of claim 15, wherein the AR scene further includes a virtual representation of a camera that is positioned adjacent to the 3D representation of the product and wherein determining the modifications of the virtual 3D representation of the product comprises identifying imaging effects on the 3D representation of the product corresponding to adjustments of the camera by the detected gestures of the user.

19. A non-transitory processor-readable storage medium storing processor-executable instructions that, when executed by a processor, are to cause the processor to:
receive a user request to edit a first two-dimensional (2D) image that is displayed on a first graphical user interface, the first 2D image depicting a product;
in response to receiving the user request to edit the first 2D image:
present, via an augmented reality (AR) device, an AR scene that includes a virtual 3D representation of a product and a view of a first graphical user interface;
monitor user interactions with the virtual 3D representation of the product based on detected gestures of the user;
determine modifications to the virtual 3D representation of the product based on the monitored user interactions;
present, in the AR scene, a modified 3D representation of the product;
convert the modified 3D representation of the product to a 2D image based on obtaining an image of the modified 3D representation of the product as output by a virtual camera associated with the AR scene; and
cause the first graphical user interface to be updated in real-time responsive to the monitored user interactions based on displaying the 2D image at a defined location of the first graphical user interface in AR.

* * * * *